US010070235B2

(12) United States Patent
Schwarzlos-Sooprayen et al.

(10) Patent No.: US 10,070,235 B2
(45) Date of Patent: Sep. 4, 2018

(54) IMPRESSION-TAKING PAD AND A METHOD FOR TAKING AN IMPRESSION OF AN EAR CANAL

(71) Applicant: Sonova AG, Stäfa (CH)

(72) Inventors: Jana-Kosima Schwarzlos-Sooprayen, Stäfa (CH); Erdal Karamuk, Männedorf (CH); Daniel Probst, Uerikon (CH); Natasha Thumm, Zürich (CH)

(73) Assignee: Sonova AG, Staefa (CH)

( * ) Notice: Subject to any disclaimer, the term of this patent is extended or adjusted under 35 U.S.C. 154(b) by 6 days.

(21) Appl. No.: 15/507,507

(22) PCT Filed: Aug. 27, 2015

(86) PCT No.: PCT/EP2015/069654
§ 371 (c)(1),
(2) Date: Feb. 28, 2017

(87) PCT Pub. No.: WO2016/045906
PCT Pub. Date: Mar. 31, 2016

(65) Prior Publication Data
US 2017/0318403 A1 Nov. 2, 2017

(30) Foreign Application Priority Data
Sep. 23, 2014 (WO) ................. PCT/EP2014/070270

(51) Int. Cl.
*H04R 25/00* (2006.01)
(52) U.S. Cl.
CPC .......... *H04R 25/652* (2013.01); *H04R 25/658* (2013.01); *H04R 2225/77* (2013.01)
(58) Field of Classification Search
CPC combination set(s) only.
See application file for complete search history.

(56) References Cited

U.S. PATENT DOCUMENTS 3,440,314 A    4/1969  Frisch
7,092,543 B1   8/2006  Mahoney et al.
(Continued)

FOREIGN PATENT DOCUMENTS

EP          0533258 A2      3/1993
WO      WO 00/42816 A1      7/2000
(Continued)

OTHER PUBLICATIONS

PCT Search Report dated Nov. 17, 2015 for PCT App. Ser. No. PCT/EP2015/069654.

*Primary Examiner* — Amir Etesam
(74) *Attorney, Agent, or Firm* — Henricks Slavin LLP

(57) ABSTRACT

This invention relates to an impression-taking pad (10) for taking an impression (20) of an ear canal (30) by an impression-taking material, having a lateral end (el) to be arranged away from a tympanic membrane (35) in said ear canal (30); and a medial end (em) to be arranged proximate to said tympanic membrane (35). The impression-taking pad (10) comprises an outer body (2) tapering from said lateral end (el) to said medial end (em). The impression-taking pad (10) further comprises an inner body (3) for releasable engagement with a tool (11, 12) for visual inspection of the ear canal (30), the inner body (3) being configured to support insertion of the impression-taking pad (10) in the ear canal (30) by the tool (11, 12). The impression-taking pad (10) comprises a duct (5) at least partially defined by the inner body (3), forming at least part of an optical path for visual inspection of the ear canal (30); wherein the optical path further comprises an inspection window (6), closing said duct (5), configured to support inspection of the ear canal (30) during the insertion of the impression-taking pad (10) in the ear canal (30); The impression-taking pad (10) is further configured to form an integral part of said impression (20). The present invention also relates to a method of taking (Continued)

an impression by the above defined impression-taking pad (10); as well as to a correlated impression-taking system comprising an aptly modified tool (11, 12) to cooperate with such an impression-taking pad (10).

21 Claims, 4 Drawing Sheets

(56) References Cited

U.S. PATENT DOCUMENTS

2006/0050914 A1* 3/2006 Urso .................... H04R 25/656
381/328
2013/0002824 A1 1/2013 Hart et al.

FOREIGN PATENT DOCUMENTS

WO    WO 2010/107364 A1    9/2010
WO    WO 2014/186910 A1    11/2014

* cited by examiner

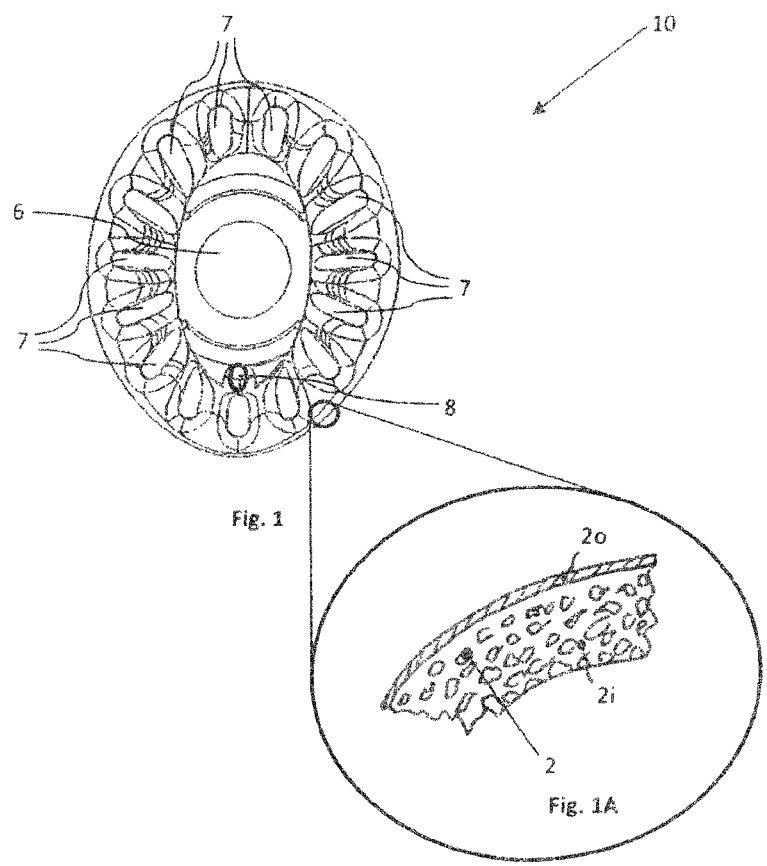
Fig. 1
Fig. 1A
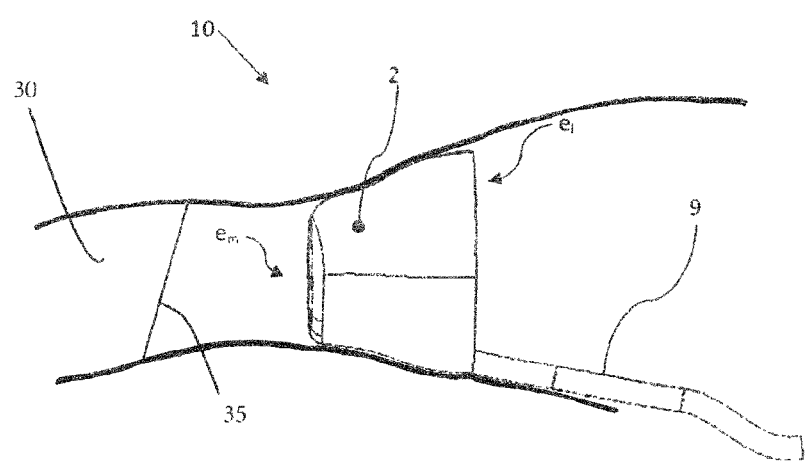
Fig. 2

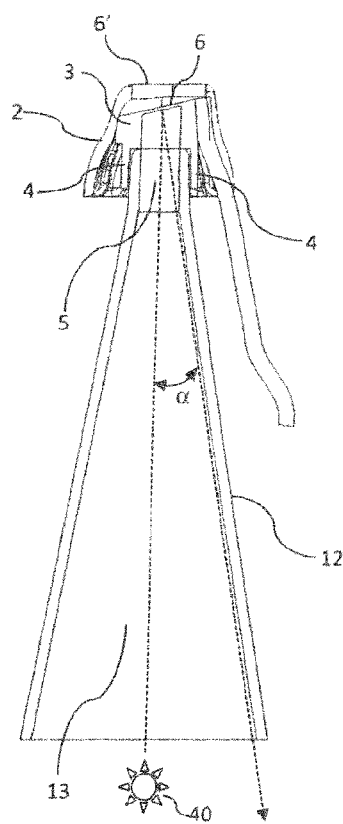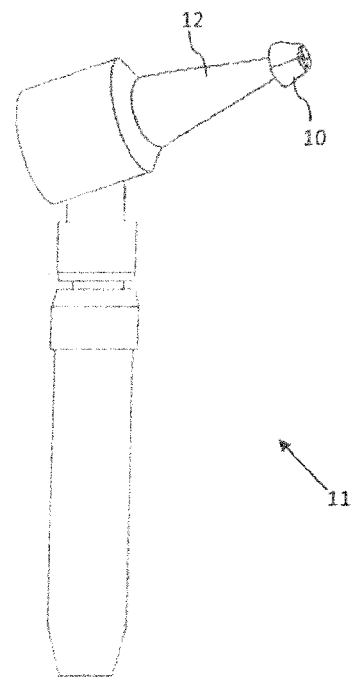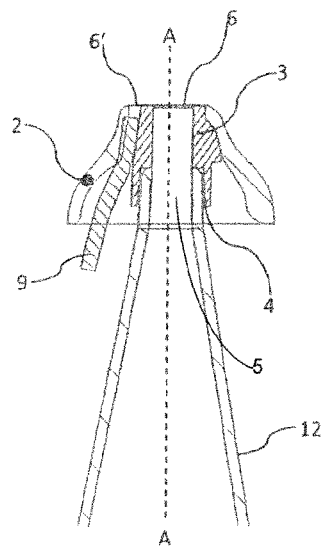
Fig. 10
Fig. 9
Fig. 11

IMPRESSION-TAKING PAD AND A METHOD FOR TAKING AN IMPRESSION OF AN EAR CANAL

CROSS-REFERENCE TO RELATED APPLICATIONS

This application is the U.S. National Stage of PCT App. Ser. No. PCT/EP2015/069654, filed Aug. 27, 2015, which claims priority to PCT App. Ser. No. PCT/EP2014/070270, filed Sep. 23, 2014.

The present invention relates to an impression-taking pad for taking an impression of an ear canal by an impression-taking material, particularly to an impression-taking pad which eventually forms an integral part of an impression. The present invention also relates to a method of taking an impression by such an impression-taking pad.

The term hearing aid shall be understood as a device to be worn at the vicinity or directly within the ear of a person to improve the individual hearing capacity of this person. Such an improvement may include the prevention of the receiving of certain acoustic signals in terms of ear protection.

In relation to their application and user indication, and according to the corresponding main solutions available on the market, such hearing devices can be worn, for instance, behind the ear (BTE), within the ear (ITE) or completely within the ear (CIC). The latest design developments have made available hearing devices that are even smaller than completely within the ear (CIC) devices, aptly named invisible in the canal (IIC) hearing aids.

Hearing aids normally comprise at least one microphone as electroacoustic input transducer; at least one speaker—usually called receiver—as electroacoustic output transducer; and an electronic signal processing circuitry, connected with said microphone and said speaker, for the processing and manipulation of electronic signals. This electronic signal processing circuitry may comprise analogue or digital signal processing devices. Said elements are usually arranged within at least one main case or shell of the hearing device. The electronic signal processing circuit performs various signal processing functions. Such signal processing functions can include amplification, background noise reduction, tone control, etc.

The signal processing functions of current hearing aids can be provided with the option of adjustable operational modes or parameters or characteristics, thus allowing user customization of the hearing aids or their prompt adaptive response to given, changeable environment conditions.

It will be recognized that the features of the present invention are substantially compatible with any style of hearing aids whose shell needs to conform to the geometry of an ear canal of a hearing aid user, including the above-mentioned models, particularly with within the ear (ITE) or completely within the ear (CIC) hearing aids and, in an especially advantageous way, with invisible in the canal (IIC) hearing aids.

Custom-made hearing aid shells that conform to the geometry of an ear canal of a specific hearing aid user are known in the prior art. In order to produce custom-made shells that adapt to an individual shape of an auditory canal, taking an impression of at least part of the auditory canal is normally required.

Typically an impression thus obtained would subsequently be surface-scanned to acquire shape data of the corresponding ear canal, in order to create a 3D model by some CAD design software tool. The ensuing 3D computer model can then be sent to a CAM system for production of the shell, for instance by additive fabrication processes such as laser sintering, stereolithography or a thermojet process, as for instance disclosed in WO 01/05207.

Alternatively, 3D digital intra-aural scanning for acquiring shape data of an ear canal by a scanning tool insertable directly in the ear canal is also known. However such a solution is, at the current stage of development, not preferred because of the complications of the technologies employed and due to the insufficient precision obtainable in imaging a recess so narrow, deep and repeatedly bent as an individual ear canal.

Naturally, the quality of the impression of an ear canal, taken for the purpose of producing a custom-made shell according to the procedures more frequently in use today, is of paramount importance for the final product to optimally conform to the geometry of the ear canal.

Completeness in reproducing the anatomy of the ear canal as well as continuity and accuracy of the surface lines reproducing the ear canal are a main concern in current ear canal impression-taking procedures. This is, for instance, all the more relevant when manufacture is envisaged of Invisible-In-Canal (IIC) hearing devices which need to be placed deep in an ear-canal.

At the same time, protection of the tympanic membrane of a user whose ear canal is taken an impression of is also an important requirement. Analogously, it would be ideal to guarantee a smooth insertion of an impression-taking pad which appropriately takes into account the specific anatomy of a patient, including detection of possible impediments or obstacles occurring in the ear canal, just at the moment of impression taking.

For an impression of an ear canal to be considered complete, it needs to extend well beyond the second bend of the ear canal, for instance at least 2 millimeters beyond such second bend, and ideally up to 8-12 millimeters beyond such bend.

As mentioned, though, deep placing an impression-taking pad in an ear canal needs to be made compatible with knowledge of the specific shape of the ear canal, instance by instance. The portion of the ear canal beyond the second bend is called the bony part. This bony part is overlaid by a layer of skin having a thickness of as little as 0.2 mm. Due to this very thin skin layer, this region of the ear canal is very sensitive to applied pressure. Further, injuries heal very poorly in this region.

Current impression-taking methods do not offer a solution to safely taking impressions of an ear canal with a controlled impression length. State of the art technologies employed in this field, fail to completely reproduce the ear canal anatomy to the required extent and, furthermore, do not guarantee precision and direct control in placing of an impression-taking pad in an ear canal. As a consequence of this, a drawback of today's technologies is that the risk of having to repeat the impression-taking process for lack of sufficient ear canal anatomy information remains high, lest the final product does not properly fit in the ear canal. This brings about additional costs and the inconvenience of going through a whole new impression-taking session for an operator—such as an audiologist, a clinician, a nurse or similar—and for a customer—in the following also designated as a patient or hearing aid user.

Another major drawback is that estimating the correct positioning of an impression-taking pad, taking into account both the actual anatomy of an ear canal and the safety of the intended hearing device user, is rather left to the experience of the operator executing the procedure of impression-taking and to the accuracy used in taking additional preliminary measurements. While the expertise of audiologists is an important asset, it is not desirable to make an impression-taking procedure dependent on the discretion of such an operator; on the contrary, it would be desirable to limit subjectivity and to introduce the possibility of empirically verifying the actual situation in the ear canal concurrently with the impression-taking.

Impression-taking pads are known, either made of cotton or of polymer foam, that are mainly used as stop plugs in an attempt to prevent impression-taking material or compound from reaching to the tympanic membrane.

EP0533258 discloses an auxiliary tool comprising a flexible tube with a flange at one end, to be inserted in an ear canal up to at least the proximity of a tympanic membrane of the ear. The flange stops an impression-taking compound from entering between the flange and the tympanic membrane.

WO2010107364 discloses a device for taking an impression of a subject's ear comprising a cup-shaped limiting member whose cross-section is adapted to the cross-section of an auditory canal.

The introduction in the ear canal of the abovementioned impression-taking pads still requires that the audiologist assesses the situation in the patient's ear canal based on personal know-how and previous measurements which do not necessarily reflect the updated status of the ear canal at the moment of impression-taking, inclusive of alterations that may have occurred as a result of a temporary condition of a patient or customer.

Such prior art impression-taking pads cannot be manipulated in a way that insertion is guaranteed at an intended location that is both close enough to the tympanic membrane to collect all relevant data on the ear canal anatomy and, at the same time, spaced away enough from a tympanic membrane not to interfere with it and not to risk contact with an impression-taking compound.

Prior art impression-taking pads also do not merge with the material used for impression taking, gaps oftentimes occurring at the transition area between pads and impression-taking material. Such an imperfect merging with the impression-taking material especially affects prior art cotton pads or conventional foam pads. This adversely results in the necessity to remove the currently used pads from the formed impression previous to carrying out the impression scan, as the information the pads convey is affected by errors and misrepresentation of the actual ear canal anatomy at a corresponding location. As a consequence, part of the precious information on the innermost portion of the ear canal, alternatively designated as the medial end of the ear canal, proximate to the tympanic membrane, goes lost. Lost information would need to be somehow artificially interpolated.

Thus, there exists a need for an impression-taking pad for taking an impression of an ear canal by an impression-taking material which is designed in a way that:

insertion of the impression-taking pad is carried out in a way that the actual situation within the ear canal is taken into account, allowing placement of the impression-taking pad in an intended location relative to the ear canal, in consideration of the requirements of sufficient depth and completeness of the impression;

safety is guaranteed, even when manipulation of the impression-taking pad during insertion in the ear-canal is carried out by operators or clinicians with limited experience;

the impression-taking pad itself incorporates and retains information relating to the anatomy of the ear canal after insertion in an intended location thereof, so that the impression-taking pad forms part of a final scannable impression.

There exists also a need for a related method of taking an impression of an ear canal, by means of an impression-taking pad designed to achieve the abovementioned objectives.

Accordingly, a major objective of the present invention is to provide an ameliorated design for an impression-taking pad that supports a guided, efficient and accurate placement of the pad in an intended location within an ear canal; as well as to provide a correlated method of taking an impression of an ear canal by such an impression-taking pad.

Another objective of the present invention is to improve the ability of an operator, such as an audiologist, a clinician or an assistant, to navigate the insertion of an impression-taking pad through the bodily structures of an ear canal and concurrently monitor its position and orientation, if necessary even throughout the insertion process, until an intended location is reached.

Yet another objective of the present invention is to provide an impression-taking pad which achieves increased bonding characteristics with an impression-taking material or compound, as well as improved properties of retaining a deformed shape taken up when positioned at an intended location of an ear canal, so that the impression-pad efficiently forms an integral part of the final scannable impression.

These problems are solved through an impression-taking pad, and a correlated method of taking an impression employing such an impression-taking pad, according to the main claims. Dependent claims further introduce particularly advantageous embodiments for such a device and related method.

The inventive solution basically requires to design an impression-taking pad comprising an inner body for releasable engagement with a tool for visual inspection of an ear canal, wherein the structure of the impression-taking pad is configured to allow its insertion in an ear canal by way of the above mentioned tool and to also support visual inspection of the ear canal, during such insertion.

In fact, the design of an impression-taking pad according to the present invention advantageously enables a placement of the impression-taking pad within an ear canal which can be concurrently guided by direct visual observation of the anatomy of the ear canal. The coupling of such an impression-taking pad with an optical system of a tool for visual inspection of an ear canal, such as a manual otoscope, an endoscope or a video-otoscope, allows a more accurate and reliable insertion of an impression-taking pad in an ear canal at an intended position functional to obtaining a deep, complete impression, while taking into account the actual shape and situation within the ear canal.

Other objectives, features and advantages of the present invention will be now described in greater detail with reference to specific embodiments represented in the attached drawings, wherein:

FIG. 1 is a bottom view of an impression-taking pad according to one embodiment of the present invention, showing an internal surface of a hollow contour of an outer body of such pad, as well as part of an inner body for releasable engagement of said pad with a tool for visual inspection of an ear canal;

FIG. 1A is a zoomed-in view of a detail of FIG. 1, schematically showing a cross-section view of the outer body of the impression-taking pad of FIG. 1;

FIG. 2 is a lateral view of the impression pad of FIG. 1;

FIG. 9 is an overall perspective view showing an impression-system comprising an impression-taking pad according to the present invention and a matching tool for visual inspection of an ear canal when assembled via a speculum;

Figure 7:
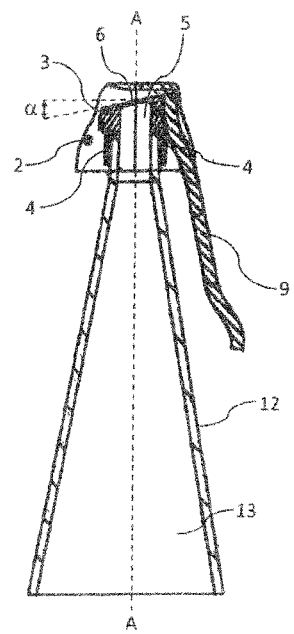
FIG. 7 is a section view of the impression-taking pad and the aural speculum of FIG. 5.

FIG. 10 is a schematic view of the impression-taking pad of FIG. 7, exemplifying how an angled inspection window of the impression pad achieves to distract light emitted by a tool for visual inspection of an ear canal in a way to avoid disturbing reflections for an operator looking through such tool; and FIG. 11 is a partial section view of an impression-taking pad according to a further embodiment, wherein an inspection window is flush with a medial end of the pad, the pad being mounted on an aural speculum.

Figure 3:
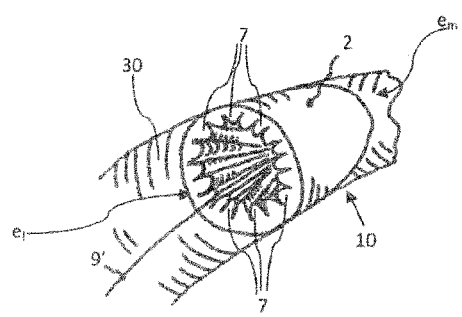
FIG. 3 is a schematic view illustrating in a simplified way an impression-taking pad according to the present invention inside an ear canal.
Figure 4:
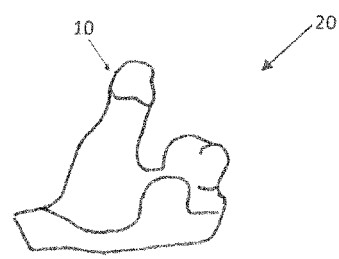
FIG. 4 is a schematic representation of an impression obtained according to the present invention.

With reference initially to FIGS. 2, 3 and 4, an impression-taking pad 10 for taking an impression 20 of an ear canal 30 of an individual by an impression-taking material according to the present invention comprises an outer body 2 having a lateral end el, to be arranged away from a tympanic membrane 35 when inserted in an ear canal 30; and a medial end em, to be arranged proximate to the tympanic membrane 35, when inserted in the ear canal 30.

In the context of the present invention, it shall be understood that the wording "lateral end" refers to a portion of an element of an impression-taking pad 10 according to the present invention which is to be arranged, or oriented, away from a tympanic membrane 35, when the pad 10 is inserted in the ear canal 30 (i.e. oriented towards the external part of the ear canal 30).

Conversely, the wording "medial end" refers to a portion of an element of an impression-taking pad 10 according to the present invention which is to be arranged, or oriented, towards a tympanic membrane 35, when the pad 10 is inserted in the ear canal 30 (i.e. oriented towards the internal part of the ear canal 30).

Figure 5:
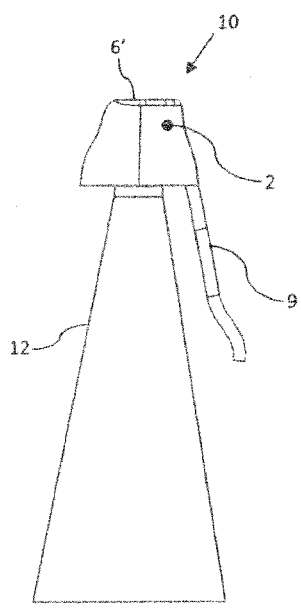
FIG. 5 is a lateral view of the impression pad of FIG. 1, when mounted on a speculum of a tool for visual inspection of an ear canal.

As evident from FIG. 2, in a preferred embodiment of the impression-taking pad 10 the outer body 2 tapers from the lateral end el to the medial end em. Preferably, the outer body 2 is elastic and has a hollow contour that, as shown at FIGS. 1, 5 and 10, can be substantially dome-shaped.

As represented more in detail in FIG. 1A, the outer body 2 comprises an outer surface 2o preferably made of a smooth material, in order to better comply with the thin and delicate skin of the ear canal, contacting the ear canal wall of an end user very softly. In order to enhance its smoothness, the outer surface 2o may be also coated.

The outer body 2 further comprises an inner surface 2i made of a material comprising a larger contact area than that of the outer surface 2o. For instance, the material of the inner surface 2i of the outer body 2 can comprise porous material such as foam, preferably integrating larger scale porosity than the outer surface 2o does.

In a preferred embodiment, such as the one shown at FIG. 1, the inner surface 2i of the outer body 2 comprises scallop-like protrusions 7, also synthetically designated scallops 7, which are preferably axially aligned along a longitudinal direction of the outer body 2. The provision of such scallops 7 advantageously provides an even pressure distribution and guarantees compliance with the ear canal walls.

Furthermore, the shape of scallops 7 provides increased specific surface area for enhanced bonding to an impression-taking material. Since the inner surface 2i of the outer body 2 comprises porous material, such as foam integrating larger scale porosity, a further improved bonding to the impression-taking material can be exhibited.

FIG. 1, and more schematically FIG. 3, show how the hollow contour of the outer body 2 can be provided with an elliptic cross section, in order to further optimise conformity with the ear canal wall, ideally providing a fluid-tight contact with such walls.

Each of the following features:

an outer surface 2o made of a smooth material;

an inner surface 2i having a macroscopic structure given by the scallops 7 as well as a microscopic structure given by the nature of the porous material, such as foam; and/or an elliptic cross section;

contributes to giving an outer body 2 of an impression-taking pad 10 according the present invention compliance properties for adaptation to the geometry of the ear canal without causing any wrinkles.

By preventing the formation of wrinkles in the impression-taking pad 10, the liquid impression-taking material is kept from flowing along and past the impression-taking pad 10 and consequently from leaking into the volume between the eardrum and the impression-taking pad 10.

An open porosity of the inner surface 2i of the outer body 2 of the impression-taking pad 10, such as the one found in a highly porous foam structure, in combination with the inner scallop structure advantageously provides the ability to retain the impression-taking pad in its deformed position, once the impression-taking material filling the hollow contour has cured. Thus, an impression which comprises the cured impression-taking material as well as the impression-taking pad bonded to the impression-taking material can be obtained.

Further advantageously, additional information relating to the contour of the ear canal can be provided, allowing to obtain a very good reproducibility.

In addition to this, the inventive impression-taking pad 10 can be made available in different sizes, in order to comply with all different ear canal sizes.

Figure 6:
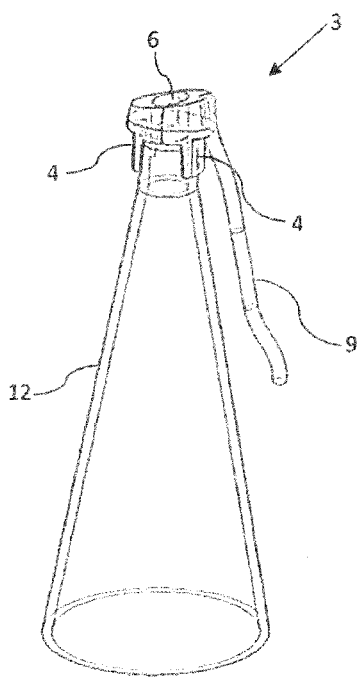
FIG. 6 is a perspective view of a further embodiment of an impression-taking pad according to the present invention, wherein an outer body has been removed and is not shown, representing one specific configuration of an inner body provided with a locking interface for releasable mounting of the pad on the aural speculum of a tool for visual inspection of an ear canal.
Figure 8:
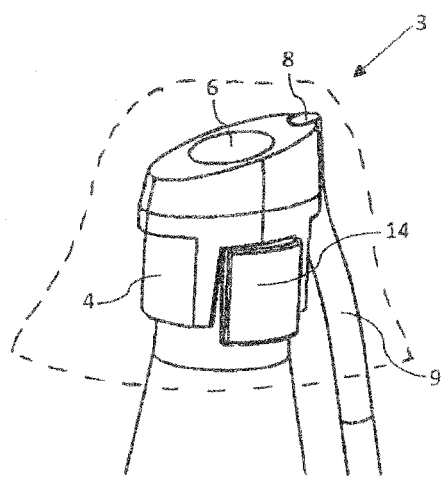
FIG. 8 is a perspective view of a detail of the impression-taking pad of FIG. 6, in combination with an aural speculum of a tool for visual inspection of an ear canal modified in a way as to comprise anti-rotational features matching with corresponding anti-rotational features of the pad's locking interface.

An impression-taking pad 10 according to the present invention comprises an inner body 3 for releasable engagement with a tool 11 for visual inspection of an ear canal 30, as for instance visible in FIGS. 6, 7 and 8.

Such an inner body 3 is configured to support insertion of the impression-taking pad 10 in the ear canal 30 by tool 11 and to support visual inspection of the ear canal 30. Preferably, the visual inspection of the ear canal is supported for at least a portion of time during the insertion of the impression pad 10; visual inspection of the ear canal 30 via the pad 10 can also be supported throughout the procedure of insertion of the pad 10.

The provision of such an inner body 3 enables a visually guided insertion of an impression-taking pad 10 according to the present invention in an ear canal 30, in a way that a precise and accurate positioning of the impression-taking pad 10 just at an intended location within the ear canal 30 is effectively achieved.

As evident from the representation of a preferred embodiment in FIGS. 6 and 7, an impression-taking pad 10 according to the present invention comprises a duct 5 which is at least partially defined by the above mentioned inner body 3.

In general, the duct 5 forms an optical path for visual inspection of the ear canal 30. Specifically, the duct 5 is configured for optical coupling with an optical channel 13 of a tool 11 for visual inspection of an ear canal 30. The duct 5 substantially leads to a final opening 6' at the medial end em of the outer body 2.

The above optical path further comprises an inspection window 6, which closes said duct 5. The inspection window 6 is preferably, but not necessarily, proximal to an outlet of the duct 5. At any rate, the inspection window 6 can also be differently positioned along the duct 5, in a way that observation of the ear canal 30 through it is anyhow enabled. The inspection window 6 is preferably provided at a medial end of the inner body 3. Such an inspection window 6 is configured to allow inspection of the ear canal 30 in connection with, or during at least a part of, the insertion of the impression-taking pad 10 in the ear canal 30. The overall optical path extends between an optical channel 13 of the tool 11 and the ear canal 30, via said duct 5 and through the inspection window 6.

Preferably, such inspection window 6 comprises a piece of optically transparent material. This piece of optically transparent material can take several shapes. For instance, the inspection window 6 can take the form of a transparent flat plate, for instance having a uniform thickness; or the form of a transparent foil; or the form of a transparent membrane. Alternatively, the inspection window 6 can take the form of an optical lens.

Particularly in the case of an optical lens, but not exclusively, the inspection window 6 can have a variable thickness wherein a front surface oriented towards an inspection light 40, and a back surface substantially opposite thereto, are not parallel, for instance if the window 6 is designed as a wedge.

The inspection window 6 can be formed of one piece with the inner body 3 or it can be attached, for instance by adhesive means, to the inner body 3 across the duct 5.

The transparent material of inspection window 6 may be a polymeric material or glass.

In particular, in case the option of a polymeric material is chosen, the inspection window 6 can be made of silicone; thermoplastic elastomers (TPE); polycarbonate (PC); polystyrene; polyethylene (PE); polymethyl methacrylate (PMMA) or polyvinyl chloride (PVC). Any other polymer having suitable properties of transparency to visible light and light transmission can also be envisaged.

Preferably, the inspection window 6 is made of a material which is not only transparent but also anti-reflective, in order to avoid that an inspection light 40 emitted by a light source in the tool 11 is reflected towards the eyes of a an operator looking though said tool 11, as such reflections may be disturbing and an impediment to the correct assessment of the anatomy of the ear canal 30. To this purpose, for instance, an antireflective coating can be applied at least to a front surface of the inspection window 6 oriented towards an inspection light 40.

In a possible embodiment, at least a region of the inner body 3 adjacent to the inspection window 6 is made of a transparent material and/or of a translucent material and/or coated with an anti-reflective material. In this instance, preferably such a region at the medial end of the inner body 3 adjacent to the inspection window 6 is made of the same material as the inspection window 6. The inner body 3 and the window 6 therein integrated can also be made completely of the same material. At any rate, in general the configuration of the window 6 within the inner body 3 is such that it allows a clear vision through duct 5 into the ear canal 30.

In a specific embodiment, the inner body 3 and the outer body 2 can advantageously be formed in one piece, particularly if out of a material which satisfies at the same time the abovementioned structural and functional requirements for the outer body 2 and for the inner body 3. Accordingly, by way of example, silicone or thermoplastic elastomers (TPE) may be used for manufacturing the entire impression-pad 10 according to the present invention. In fact, silicone or thermoplastic elastomers allow to obtain a soft outer body 2 comprising a smooth outer surface 2o and an inner surface 2i with good bonding properties, as well as an inner body 3 which is resistant to deformation as appropriate. Otherwise, the outer body and the inner body 3 can be made integral to each other, for instance by adhesive bonding.

With reference to the embodiment of FIGS. 6 and 7, the inner body 3 can be arranged substantially internal to the hollow contour of the outer body 2.

The outer body 2 at the medial end em comprises an opening 6' which is positioned with respect to the inspection window 6 in a way that a clear vision through duct 5 into the ear canal 30 via tool 11 and the pad 10 is guaranteed. Thus, the opening 6' extends at least over an area corresponding to the inspection window 6. Thus, the abovementioned optical path extending between an optical channel 13 of the tool 11 and the ear canal 30, via said duct 5 and through the inspection window 6, remains optically unobstructed.

In the embodiment of FIG. 11, wherein the inspection window 6 is exemplified as a flat, uniform thickness of transparent material, the inspection window 6 lies in a plane that is substantially perpendicular to a longitudinal axis A-A of duct 5.

As consequence, in such an embodiment, the medial end of the inner body 3 incorporating the inspection window 6 is substantially on an even plane, flush with the opening 6' on the medial end em of the outer body 2.

More generally, according to such configuration, the inspection window 6 can comprise a front surface, oriented towards an inspection light 40, which lies in a plane substantially perpendicular to a longitudinal axis A-A of the duct 5.

Otherwise, the inspection window 6 can comprise a front surface, oriented towards an inspection light 40, which lies in a plane at an angle α different from 90°, with respect to a longitudinal axis A-A of the duct 5.

In general, by a front surface of the inspection window 6 it is meant a light-incident surface that is oriented towards an inspection light 40 and, therefore, towards an operator or viewer observing through an optical channel 13 of a tool 11, 12 for visual inspection of the ear canal 30.

By a back surface of the inspection window 6 it is meant a light-exit surface, substantially opposite to the front surface, that is oriented towards an opening 6' on the medial end em of the outer body 2

With reference to the embodiment of FIG. 6, the inspection window 6, exemplified as a flat, uniform thickness of transparent material, lies in a plane that is at an angle α with respect to the longitudinal axis A-A of duct 5. Angle α is preferably a function of the taper angle of the speculum 12 of the tool 11, and in a preferred embodiment is substantially equal to such taper angle.

According to the models of aural specula mostly suitable to ear canal inspection, angle α can be comprised in a range of 8°-45°. In a preferred embodiment, angle α is substantially equal to 12°.

As illustrated in FIGS. 7 and 10, in this case inspection window 6 is at least partially internal to the medial end em of the outer body 2, the outer body 2 extending itself beyond the inner body 3 along longitudinal axis A-A on the side adjacent to the medial end em. This configuration ultimately results in a hollow space comprised between a medial end of the inner body 3 and the opening 6' at the medial end em of the outer body 2. Such hollow space is itself part of the overall optical path extending between an optical channel 13 of the tool 11 and the ear canal 30. In this case, the duct 5 is also partially defined by the internal walls of the outer body 2.

A portion of the light emitted by a light source 40 of the tool 11 for visual inspection of ear canal 30 does not make it past the interface between air in the duct 5 and the surface of inspection window 6, because of reflection inherent to the interface between two media such as air and the material of the window 6.

The provision of an angle α as above defined advantageously achieves to minimize the portion of inspection light emitted by a light source 40 of the tool 11 which is reflected back to the eyes of an operator looking though said tool 11.

As represented in FIG. 10, in fact, the design of the inspection window 6 is adapted to selectively deviate the portion of the light incident on the inspection window 6 which is reflected, so that the reflected light travels back substantially parallel to the internal surface of the speculum 12, in a way that the vision of the above operator is not adversely affected.

Preferably, the inner body 3 comprises a locking interface 4, at a lateral end thereof, configured for releasable mounting on an aural speculum 12 of the tool 11 for visual inspection of the ear canal 30.

The locking interface 4 can comprise a form-fit mechanism; or a press-fit mechanism; or a click-in mechanism.

In the case of a click-in mechanism, for instance, a circumferential projection or lip can interact with a groove formed in the aural speculum 12 of tool 11, thus fixing the impression-taking pad 10 on the speculum 12.

By way of example, alternatively a bayonet mount fastening mechanism can be employed for connecting the impression-taking pad 10 according to the present invention with a speculum 12, for instance consisting of a cylindrical male side on the inner body 3 of the pad 10 provided with one or more radial pins, and a female receptor with matching L-shaped slot(s) on the speculum 12—or viceversa—. A screw connector can also be used to couple inner body 3 and speculum 12. With reference to FIGS. 8 and 10, the locking interface 4 can be arranged substantially internal to the hollow contour of the outer body 2.

The inner body 3 can also comprise a joint by means of which the impression-taking pad 10 can be coupled to the speculum 12 of tool 11, in order to enhance flexibility and increase the degrees of freedom of relative movement between pad 10 and speculum 12 at the time of insertion of the pad 10. For instance, a spherical hinge can be provided to simplify insertion of the pad 10 in the ear canal 30.

Preferably, the locking interface 4 comprises anti-rotational means configured to prevent changes in an angular position of the impression-taking pad 10 on the aural speculum of tool 11. The anti-rotational means of the locking interface 4 can therefore match with corresponding anti-rotation means 14 on the speculum 12 of the tool 11. For instance, in FIG. 8 an embodiment is represented wherein at least a slot of the locking interface 4 can be configured to engage with a projection of a speculum 12 in a way that the a stop surface of the slot abuts against a corresponding stop surface of the speculum projection. In this way, a relative rotation of the impression-taking pad around a longitudinal axis A-A of the duct 5 can be prevented so that the pad 10 remains oriented as desired within the ear canal 30.

An impression-taking pad 10 according to the present invention preferably comprises pressure relief means 9, such as a pressure relief tube (also designatable as ventilation tube), for equalizing pressure between a medial portion of the ear canal 30 comprised between the pad 10 and the tympanic membrane 35 and the outer, more lateral portion of the ear canal 30. In FIGS. 7 and 10, it is illustrated how a pressure relief tube 9 can be fixed between the outer body 2 and the inner body 3 of an impression-talking pad 10 according to the present invention, for instance by adhesive means of by some other mechanical fastening or fixation means. In FIGS. 6 and 8, it is exemplified how the inner body 3 itself can integrate an attachment 8 for a pressure relief tube 9. The attachment 8 can be provided at a plane—either perpendicular or differently angled with respect to the longitudinal axis A-A of duct 5—at the medial end of the inner body 3.

An impression-taking pad 10 according to the present invention preferably also comprises a pad removal means 9', such as a removal thread or yarn, for extraction of the pad 10 from the ear canal 30, as a safety measure in compliance with regulations for devices adapted to be provisionally introduced in the human body.

In a particular embodiment, a pressure relief means 9 can carry out the additional function of a pad removal means. In fact, a pressure relief tube 9 can also be configured to be used as a removal yarn 9', for instance by way of reinforcing the attachment of the pressure relief tube 9 to the pad structure.

In an exemplary embodiment, a removal yarn 9' can be made integral with a pressure relief tube 9. For example, the removal yarn 9' can be molded with the material of the pressure relief tube 9. By doing so, the pressure relief tube is stiffened in an axial direction thereof. Therefore, excessive stretching of the pressure relief tube 9 in connection with the extraction from the ear canal 30 is prevented. Combining the two functions of pressure relief means and removal means as above described results in an easy and simple configuration as well as in reduced manufacturing costs.

In other possible embodiments, a tube 9 as above introduced can also be employed as a probe tube for carrying out the additional function of conducting real-ear measurements. Real ear measurements are typically carried out for optimizing and/or verifying a fitting. For such measurements is necessary to place a probe-tube in the vicinity of the eardrum.

For instance, real-ear-to-coupler difference (RECD) could be measured via tube 9, that is the difference between the output in the real-ear and the output on a 2 cc coupler that is used in the hearing aid fitting and verification process.

Real-ear-to-coupler difference (RECD) can be defined as the difference in decibels across frequencies between the sound pressure level (SPL) measured in the real ear canal and that, instead, in a 2 cc coupler, produced by a transducer generating the same input signal.

Generally, the general RECD measurement procedure consists of two measurements: a first measurement in the form of a 2 cc coupler-based measurement; and a second measurement in the form of a real-ear measurement.

On the one hand, a 2 cc coupler measurement is made on the same coupler traditionally used for hearing aid fitting and verification. A transducer, such as a receiver, from the real-ear system delivers a signal into the 2 cc coupler and the system defines the SPL of the signal as a function of frequency.

On the other hand, the same signal is then delivered from the same transducer into the individual's ear via a custom earmold. The real-ear system again measures the level of the signal, in this instance directly in the individual's ear, as a function of frequency.

Thanks to the present invention, the impression produced in the impression-making process can be advantageously used to work as a custom earmold incorporating a pad 10 as above described. An impression-taking pad 10 according to the present invention, comprising a tube 9 as above introduced, allows to safely collect reliable data given that the tube probe can be neatly positioned in a visually-controlled way with respect to ear canal wall and the tympanic membrane as already described.

Otherwise, also by way of example, values can be measured that are in general representative of configurations wherein the hearing aid is worn by a user and in place in the ear canal but turned off. By way of example, via said tube 9 the so called real-ear occluded gain could be measured, which expresses the difference in decibels, across frequencies, between:

the signal level measure in the individual hear canal, on the one hand, emitted by the medial end of the tube 9 proximal to the tympanic membrane 35; and the input signal from a test receiver connected to the tube 9 at the lateral end of the tube, externally to the ear canal, on the other hand.

Such a measurement could help evaluating venting characteristics in the case that a vent is provided in an acoustic device.

The present invention also relates to an impression-taking system comprising:

an impression-taking pad 10 as above described, comprising an inner body 3 supporting insertion of the impression-taking pad 10 in the ear canal 30 by tool a 11 and concurrently supporting visual inspection of said ear canal 30; and a tool 11 for visual inspection of an ear canal 30 comprising a speculum 12, positioned at the distal end of the tool 11, adapted to releasably engage with the impression-taking pad (10).

In order to enable efficient release of the pad 10 once placed in an intended location, the system is designed in such a way that a directional force-fit coupling is provided between the inner body 3 and the aural speculum 12 that is weaker than a directional force-fit coupling provided between the outer body 2 and the wall of the ear canal 30, when retracting the aural speculum 12 from the ear canal.

The above special arrangement of different directional force-fit couplings brings about the result that the friction force between the inner body 3 and the speculum 12 is smaller than the friction force between the outer body 2 of the impression-taking pad 10 and the wall of said ear canal 30. As a consequence, the impression-taking pad 10 remains in the intended location of insertion in the ear canal 30 and its position is not affected by the disengagement and extraction of the aural speculum 12.

The present invention also relates to a method of taking an impression of an ear canal 30, by means of an impression-taking pad 10 as above described and by means of a corresponding impression-taking material which generally takes the form of an impression-taking compound.

Pads 10 according to the present invention can be provided as an array of analogously designed but differently scaled products. As a preliminary step, a correct size between a plurality of differently sized impression-taking pads 10 designed according to the present invention can be identified, so that a pad 10 is selected which is suitable for the individual dimensions of a specific ear canal 30. Such a verification is mainly aimed at ensuring that the pad 10 eventually used guarantees leak-tight sealing against the walls of the ear canal 30 to prevent impression-taking material from flowing past the pad towards the tympanic membrane 35, in consideration of the individual dimensions of such ear canal.

The impression-taking method according to the present invention comprises engaging an impression-taking pad 10 with a tool 11 for visual inspection of the ear canal 30.

Preferably, such said engagement operation comprises more specifically the step of establishing a releasable engagement of an inner body 3 of the pad 10 with a speculum 12 positioned at a distal end of the tool 11.

Subsequently, the method comprises the step of inserting the impression-taking pad 10 in the ear canal 30 by the tool 11 in a way that a medial end of the impression-taking pad 10 is arranged in the ear canal 30 proximate to a tympanic membrane 35.

For at least a portion of time during the insertion of the impression-taking pad 10, visual information on the ear canal 30 can be collected by said tool 11 through the pad 10, such that a positioning of the impression-taking pad 10 relative to the ear canal 30 is achieved at an intended location. A smooth outer surface $2o$ of the outer body 2 improves the reset force of the pad 10, required to hold the pad in place at the intended location where the tool 11 brought it. Therefore, undesired further displacements of the pad 10 after an intended location has been reached, for instance in connection with the extraction of the speculum 12 from the ear canal 30, are advantageously avoided. To this purpose, the smooth outer surface of the outer body 2 can be provided with a suitably small scale and fine porosity at a microscopic level.

Such visual information on the ear canal 30 can be collected in particular thanks to the fact that the inner body 3 is configured to support both insertion of the impression-taking pad 10 in the ear canal 30 by said tool 11 and to concurrently support visual inspection of said ear canal 30, as above described.

Subsequently, the ear canal 30 is filled with impression-taking material, for instance a silicone based material, up to the impression-taking pad 10. The impression-taking pad 10 is thus embedded into the impression-taking material. In this respect, the inner surface $2i$ of the outer body 2 is structured so that mechanical interlocking with the impression-taking material is enhanced, as above described, advantageously by providing aptly dimensioned pores into which the impression-taking material flows.

The present method comprises then the step of letting the impression-taking material cure within the ear canal 30 to become integral with the impression-taking pad 10 and to consequently form an impression 20.

The impression 20 is then removed from the ear canal 30.

The outer body 2 of the impression-taking pad 10 deforms such that the positioning of the impression-taking pad relative to the ear canal 30 at said intended location remains unchanged upon removal of the impression 20 from the ear canal 30. Thanks to the scallop structure as described, the pad 10 keeps its deformed state corresponding to the local anatomy of the ear canal, preferably at least for a time sufficient to extract the impression 20 and to scan the surface thereof.

Thanks to the present invention, the positioning of the impression-taking pad 10 relative to the ear canal 30 at an intended location can advantageously be achieved even only by collecting visual information on the ear canal 30 by the tool 11 for at least a time portion during insertion of the impression-taking pad 10, no previous measuring of the ear canal length being strictly needed anymore. In fact, the position of the impression-taking pad 10 relative to the ear canal 30, as well as its eventual placement in said intended location, can be visually controlled during insertion in the ear-canal 30.

FIG. 4 shows an impression 20 comprising cured impression-taking material 30 and the impression-taking pad 10 according to the present invention fixedly engaged with the cured impression-taking material 30. The impression 20 exhibits a perfect transition between surfaces of the impression-taking material and the impression-taking pad 10. In fact, the inventive impression-taking pad 10 allows to obtain a seamless interface with the impression-taking material.

Advantageously, the impression 28 is free from any surface defects, such as cavities, cracks, corrugations or similar, between the impression-taking material and the impression-taking pad 10. Avoiding such defects or imperfections allows gathering of all important information relating to the ear canal anatomy, increasing the precision of the scanning process.

Advantageously, the outer surface 2o of the outer body 2 of the impression-taking pad 10 can be reliably, easily and completely recognized by a scanning device, so that the scanning of the impression 20 results in precise ear canal impression model data. Such data can be further refined or processed by some CAD design software.

Consequently, the custom ear canal shell can be manufactured, preferably by means of a subtractive and/or additive production step(s), using the ear canal impression model data. This allows to obtain a high quality, customized ear canal shell, suitable for deep insertion into the ear canal 30 of a customer, as it is for instance required in Invisible-in-Canal hearing devices.

The fact that an impression-taking pad 10 according to the present invention, contrary to the prior art, is designed to be left on the impression 20 after extraction from the ear canal 30 improves the accuracy of the data collected from impression scanning and their conformity to the actual customer situation. Particularly, it allows to correctly infer and transfer the information about optimal position and orientation of a sound outlet in the customized shell of a final hearing device.

Advantageously, the medial end em of the outer body 2 of the impression-taking pad 10 is defined by a plane, wherein the opening 6' preferably lies, which allows to uniquely identify and reconstruct, by way of the scanning software, where a sound outlet plane is to be optimally planned. It also allows to consequently define the ideal orientation of the sound outlet towards the tympanic membrane 35. Clear, unequivocal recognition of a plane corresponding to the sound outlet plane in the final shell is of utmost importance for obtaining an end product consistently adapted to the actual conformation of the ear canal of the specific end user and for avoiding incongruous positioning of the sound outlet.

The present invention also relates to a method of manufacturing a custom ear canal shell, comprising:
scanning an impression 20 as above described, wherein the impression 20 includes an impression-taking pad 10 according to the present invention, by means of an impression scanner;
obtaining, by such scanning, ear canal impression model data;
and subsequently manufacturing a custom ear canal shell by means of at least one subtractive and/or additive production step, using the ear canal impression model data.

The present invention also relates to a custom ear canal shell, manufactured by carrying out the above manufacturing method, configured for deep insertion into an ear canal 30. It also relates to a hearing aid comprising such a custom ear canal shell, the hearing aid being configured for deep insertion into the ear canal 30, for instance in the form of an invisible in the canal (IIC) hearing aid.

The invention claimed is:

1. An impression-taking pad for use with impression-taking material, a visual inspection tool, and an ear having an ear canal and a tympanic membrane, the impression-taking pad comprising:
   a resilient outer body defining a lateral end, a medial end, an outer surface that tapers from the lateral end to the medial end and that is configured to engage the ear canal, and an outer body opening that extends through the medial end of the resilient outer body;
   an inner body configured to releasably engage the visual inspection tool during insertion of the outer body into the ear canal;
   a duct at least partially defined by the inner body and including a medial end; and
   an at least translucent inspection window associated with the medial end of the duct and located within the resilient outer body;
   wherein the outer body opening, duct, and inspection window together define an optical path.

2. The impression-taking pad claimed in claim 1, wherein the inspection window is formed from an optically transparent material.

3. The impression-taking pad claimed in claim 1, wherein the duct defines a longitudinal axis; and
   the inspection window includes a front surface that lies in a plane that is substantially perpendicular to the longitudinal axis.

4. The impression-taking pad according to claim 1, wherein
   the duct defines a longitudinal axis; and
   the inspection window includes a front surface that lies in a plane that is not perpendicular to the longitudinal axis.

5. The impression-taking pad claimed in claim 4, wherein the plane is oriented at an angle within the range of 8° to 45° relative to the longitudinal axis.

6. The impression-taking pad claimed in claim 1, wherein the inspection window and the inner body are parts of the same one-piece structure.

7. The impression-taking pad claimed in claim 1, wherein the inspection window is attached to the inner body and extends across the duct.

8. The impression-taking pad claimed in claim 1, wherein the inspection window includes a front surface that is coated with antireflective material.

9. The impression-taking pad claimed in claim 1, wherein at least a region of the inner body that is adjacent to the inspection window is formed from a transparent material and/or is formed from a translucent material and/or is coated with an antireflective material.

10. The impression-taking pad claimed in claim 1, wherein
the inspection tool includes an aural speculum; and
the inner body includes a locking interface configured to releasably engage the aural speculum.

11. The impression-taking pad claimed in claim 10, wherein
the locking interface includes an anti-rotational device configured to prevent changes in angular position of the inner body relative to the aural speculum.

12. The impression-taking pad claimed in claim 1, further comprising:
a pressure relief tube and/or a removal device.

13. The impression-taking pad claimed in claim 12, wherein
the inner body includes an attachment for the pressure relief tube and/or removal device.

14. The impression-taking pad claimed in claim 1, wherein
the inner body and the outer body are parts of the same one-piece structure.

15. The impression-taking pad claimed in claim 1, wherein
the inspection tool includes an aural speculum; and
the inner body includes a joint configured to couple the inner body to the aural speculum.

16. The impression-taking pad claimed in claim 1, wherein
the outer body includes an inner surface with scallop-like protrusions.

17. An impression-taking system for use with impression-taking material, a visual inspection tool, and an ear having an ear canal and a tympanic membrane, the impression-taking system comprising:
the impression-taking pad claimed in claim 1; and
a visual inspection tool including an aural speculum;
wherein the inner body of the impression-taking pad is configured to releasably engage the visual inspection tool during insertion into the ear canal.

18. The impression-taking system of claim 17, wherein
the outer body and the ear canal form a directional force-fit coupling when the impression-taking pad is compressed within the ear canal; and
the inner body of the impression-taking pad and the aural speculum form a directional force-fit coupling that is weaker than the directional force-fit coupling between the outer body and the ear canal when retracting the aural speculum from the ear canal.

19. A method of taking an impression of an ear canal, comprising the steps of:
mounting the impression-taking pad claimed in claim 1 onto a visual inspection tool;
inserting the impression-taking pad into the ear canal with the visual inspection tool until the medial end of the resilient outer body is adjacent to the tympanic membrane and, during at least a portion of the insertion, collecting visual information regarding the ear canal;
filling the ear canal with impression-taking material up to the impression-taking pad;
letting the impression-taking material cure within the ear canal to become integral with the impression-taking pad and form an impression; and
removing the impression from the ear canal.

20. The method of claim 19, further comprising the step of:
collecting visual information comprises collecting visual information through the impression taking pad with the visual inspection tool.

21. The method of claim 19, wherein
inserting the impression-taking pad into the ear canal comprises deforming the resilient outer body in such a manner that the impression-taking pad locations within the ear canal will remain unchanged during removal of the visual inspection tool from the ear canal.

* * * * *